(12) United States Patent
Olesinski et al.

(10) Patent No.: US 8,189,578 B2
(45) Date of Patent: May 29, 2012

(54) SIMPLE FAIRNESS PROTOCOLS FOR DAISY CHAIN INTERCONNECTS

(75) Inventors: Wladyslaw Olesinski, Pleasanton, CA (US); Hans Eberle, Sunnyvale, CA (US); Nils Gura, Mountain View, CA (US); Robert A. Dickson, Harvard, MA (US); Aron J. Silverton, Chicago, IL (US); Sumti Jairath, Santa Clara, CA (US); Peter J. Yakutis, Lexington, MA (US)

(73) Assignee: Oracle America, Inc., Redwood City, CA (US)

( * ) Notice: Subject to any disclaimer, the term of this patent is extended or adjusted under 35 U.S.C. 154(b) by 529 days.

(21) Appl. No.: 12/495,498

(22) Filed: Jun. 30, 2009

(65) Prior Publication Data
US 2010/0329250 A1    Dec. 30, 2010

(51) Int. Cl.
*H04L 12/28* (2006.01)
(52) U.S. Cl. ........ 370/389; 370/235; 370/394; 370/412; 710/52
(58) Field of Classification Search .................. None
See application file for complete search history.

(56) References Cited

OTHER PUBLICATIONS

Kumar, R., Zyuban, V., Tullsen, D. M., "Interconnections in Multi-Core Architectures: Understanding Mechanisms, Overheads and Scaling", IEEE, May 2005, 12 pages.

Kumar, S., Jantsch, A., Soininen, J., Forsell, M., Millberg, M., Oberg, J., Tiensyrja, K., Hemani, A., "A Network on Chip Architecture and Design Methodology", IEEE Computer Society, Proceedings of the IEEE Computer Society Annual Symposium on VLSI, Apr. 25-26, 2002, 8 pages.

Kim, J., Balfour, J., Dally, W. J., "Flattened Butterfly Topology for On-Chip Networks", IEEE Computer Architecture Letters, vol. 6, Jul. 12, 2007, 4 pages.

Dally, W. J., Towles, B., "Route Packets, Not Wires: On-Chip Interconnection Networks", DAC 2001, Jun. 18-22, 2001, 6 pages.

Benini, L., De Micheli, G., "Networks on Chips: A New Paradigm for Component-Based MPSoC Design", Jan. 2004, 24 pages.

*Primary Examiner* — Ayaz Sheikh
*Assistant Examiner* — Nicholas Sloms
(74) *Attorney, Agent, or Firm* — Osha • Liang LLP

(57) ABSTRACT

A method for transmitting packets, including forwarding a first set of upstream packets and a first set of local packets by inserting at least one of the first set of local packets between subsets of the first set of upstream packets according to a first insertion rate; calculating a second insertion rate after forwarding a predetermined number of upstream packets generated by a single upstream source, by dividing a cardinality of the first set of upstream packets by a greatest common divisor of the predetermined number and the cardinality of the first set of upstream packets; and forwarding a second set of upstream packets and a second set of local packets from the local switch to the downstream switch by inserting at least one of the second set of local packets between subsets of the second set of upstream packets according to the second insertion rate.

16 Claims, 7 Drawing Sheets

Example 1
610

No. of 3-bit USPCs: 2 (i.e., USPC A, USPC B)

Counter Values During Initialization Procedure:
  USPC A = 6
  USPC B = 8
  AUPC = 14

Counter/Register Values Calculated by Initialization Procedure:
  UPWC = UPWC Register = AUPC >> 3 = 1
  UPC = UPC Register = AUPC/gcd(AUPC, 8) = 14/2 = 7
  LPC = LPC Register = 8/gcd(AUPC, 8) = 8/2 = 4

RESULTING BANDWIDTH ALLOCATION:   U L U L U L U L U U U

U = Upstream Packet
L = Local Packet

Example 2
612

No. of 3-bit USPCs: 3 (i.e., USPC X, USPC Y, USPC Z)

Counter Values During Initialization Procedure:
  USPC X = 6
  USPC Y = 6
  USPC Z = 8
  AUPC = 20

Counter/Register Values Calculated by Initialization Procedure:
  UPWC = UPWC Register = AUPC >> 3 = 2
  UPC = UPC Register = AUPC/gcd(AUPC, 8) = 20/4 = 5
  LPC = LPC Register = 8/gcd(AUPC, 8) = 8/4 = 2

RESULTING BANDWIDTH ALLOCATION:   U U L U U L U

U = Upstream Packet
L = Local Packet

FIG 6

SIMPLE FAIRNESS PROTOCOLS FOR DAISY CHAIN INTERCONNECTS

BACKGROUND

Network-on-Chip (NoC) is a model for communications within systems implemented on a single chip (e.g., a silicon chip). In a NoC system, multiple devices such as processor cores, memories, IO devices, and specialized logic blocks exchange data (e.g., data packets) using a network. A switched NoC is constructed from multiple point-to-point data links interconnected by switches, such that the data packets can be relayed from any source device to any destination device over several data links, by way of specific routing decisions at the switches.

In a switched NoC system, a high level of parallelism is achieved because all links and switches in the switched NoC may operate simultaneously on different data packets. Accordingly, as the complexity of integrated circuits continues to grow, a switched NoC provides enhanced performance (e.g., throughput) and scalability. However, algorithms must be designed in such a way to offer large parallelism and thus utilize the potential of the switched NoC architecture.

SUMMARY

In general, in one aspect, the invention relates to a method for transmitting packets. The method comprises: forwarding a first plurality of upstream packets and a first plurality of local packets from a local switch to a downstream switch by: inserting at least one of the first plurality of local packets between subsets of the first plurality of upstream packets according to a first insertion rate; calculating a second insertion rate after forwarding a predetermined number of upstream packets generated by a single upstream source operatively connected to the local switch by: dividing a cardinality of the first plurality of upstream packets by a greatest common divisor of the predetermined number and the cardinality of the first plurality of upstream packets; and forwarding a second plurality of upstream packets and a second plurality of local packets from the local switch to the downstream switch by: inserting at least one of the second plurality of local packets between subsets of the second plurality of upstream packets according to the second insertion rate.

In general, in one aspect, the invention relates to a method for transmitting packets. The method comprises: forwarding a first set of upstream packets from a local switch to a downstream switch; modifying, in the local switch, an upstream packet window counter (UPWC), an upstream packet counter (UPC), and at least one of a plurality of upstream switch packet counters (USPCs) in response to forwarding each of the first set of upstream packets, wherein at least one of the plurality of USPCs equals a predetermined value after forwarding the first set of upstream packets; forwarding a local packet from the local switch to the downstream switch after forwarding the first set of upstream packets; setting a UPC register to a sum of the plurality of USPCs, setting a UPWC register to the sum after performing a plurality of bitwise right shift operations on the sum, and setting the plurality of USPCs to zero; forwarding, after setting the plurality of USPCs to zero, a second set of upstream packets from the local switch to the downstream switch; modifying the UPWC, the UPC, and at least one of the plurality of USPCs in response to forwarding each of the second set of upstream packets, wherein each of the plurality of USPCs is less than the predetermined value after forwarding the second set of upstream packets; restoring the UWPC to a value of the UPWC register after forwarding the second number of packets; and forwarding, after restoring the UWPC, a third set of upstream packets from the local switch to the downstream switch.

In general, in one aspect, the invention relates to a system for transmitting packets. The system comprises: an upstream packet counter (UPC), an upstream packet window counter (UPWC), and a plurality of upstream switch packet counters (USPCs) configured to change in response to forwarding a first set of upstream packets, a second set of upstream packets, and a third set of upstream packets to a downstream switch; a local packet queue (LPQ) storing a local packet for transmission to the downstream switch after forwarding the first set of upstream packets to the downstream switch and before forwarding the second set of upstream packets to the downstream switch; a local packet counter (LPC) configured to decrement in response to forwarding the local packet; a UPWC register for restoring the UPWC before the third set of upstream packets is forwarded to the downstream switch; and a scheduling engine operatively connected to the UPC, the plurality of USPCs, the UPWC, the UPWC register, and the LPQ, and configured to obtain a sum of the USPCs and set the UPWC register to the sum after performing a plurality of bitwise right shift operations on the sum, wherein at least one of the plurality of USPCs equals a predetermined value after the first set of upstream packets is forwarded to the downstream switch, wherein the scheduling engine, the UPC, the plurality of USPCs, the UPWC, the UPWC register, and the LPQ are located on a local switch operatively connected to the downstream switch, and wherein the first set of upstream packets, the second set of upstream packets, and the third set of upstream packets are generated by at least one upstream source operatively connected to the local switch.

Other aspects of the invention will be apparent from the following description and the appended claims.

BRIEF DESCRIPTION OF DRAWINGS

FIG. 6 shows examples in accordance with one or more embodiments of the invention.

DETAILED DESCRIPTION

Figure 1:
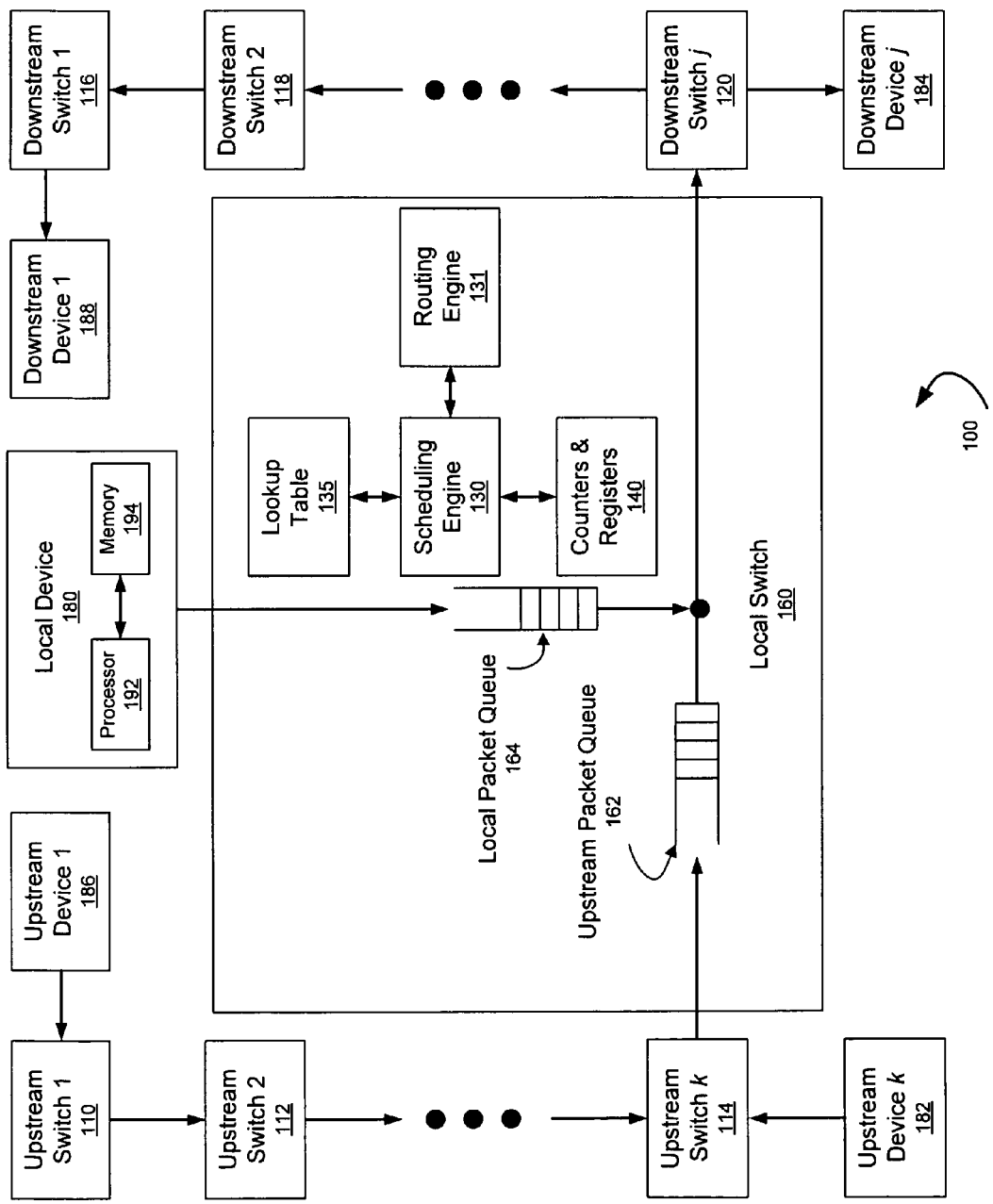
FIG. 1 shows a system having multiple components in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a system and method for transmitting packets (e.g., data packets, control packets) between multiple switches arranged in a bidirectional daisy chain topology. Each switch is connected to a device (e.g., a processor, a memory, IO device) that exchanges packets with other devices in the system. A fairness protocol with access to multiple counters in the switch dictates switch operation. Specifically, the values of the multiple counters are used for determining when to alternate between forwarding packets from a local device and forwarding packets from other switches in the bidirectional daisy chain topology. The switches and the devices may be part of a switched NoC architecture (i.e., the switches and the devices may be located on a single chip).

FIG. 1 shows a system (100) in accordance with one or more embodiments of the invention. As shown in FIG. 1, the system (100) has multiple switches (i.e., Upstream Switch 1 (110), Upstream Switch 2 (112), Upstream Switch k (114), Local Switch (160), Downstream Switch 1 (116), Downstream Switch 2 (118), Downstream Switch j (120)). The switches located to the right of the local switch (160) (i.e., Downstream Switch 1 (116), Downstream Switch 2 (118), and Downstream Switch j (120)) are considered downstream switches. In contrast, the switches located to the left of the local switch (160) (i.e., Upstream Switch 1 (110), Upstream Switch 2 (112), Upstream Switch k (114)) are considered upstream switches. All switches (110, 112, 114, 116, 118, 120, 160) may have essentially the same components (discussed below).

In one or more embodiments of the invention, each switch is connected to a device. A device connected to an upstream switch (e.g., Upstream Device k (182), Upstream Device 1 (186)) may be considered an upstream device. Moreover, the combination of an upstream device and its corresponding upstream switch may be referred to as an upstream source. In contrast, a device connected to a downstream switch (e.g., Downstream Device j (184), Downstream Device 1 (188)) may be considered a downstream device. As shown in FIG. 1, the upstream switch 1 (110) and the upstream switch k (114) are connected to the upstream device 1 (186) and the upstream device k (182), respectively. Similarly, the downstream switch 1 (116) and the downstream switch j (120) are connected to the downstream device 1 (188) and the downstream device j (184), respectively. As also shown in FIG. 1, the local switch (160) is connected to the local device (180). Each device (180, 182, 184, 186, 188) may include one or more processing cores, an IO device, a memory (e.g., a cache memory), and/or a specialized logic block. For example, the local device (180) includes a processor (192) and a memory (194).

In one or more embodiments of the invention, a device is a source and/or a destination of a packet (e.g., data packet, control packet, etc.). In other words, a device in the system (100) may be configured to generate packets destined for other devices in the system (100). Similarly, a device in the system (100) may be configured to accept packets generated by other devices in the system (100). In one or more embodiments of the invention, the header of a packet identifies the source device and/or the destination device of the packet. For example, consider a processor request for the contents of a memory address (i.e., memory location). If the processor issuing the request and the memory block having the memory address are located in different devices, a packet may be used to send the request to the memory block. The packet would be generated by the device having the processor and destined for the device having the memory block with the desired memory address. Those skilled in the art, having the benefit of this detailed description, will appreciate that a response to the request may also be sent using a packet.

In one or more embodiments of the invention, the switches (110, 112, 114, 116, 118, 120, 160) are used to route packets between the devices (180, 182, 184, 186, 188). In other words, a packet generated by any device may be routed to any other device in the system (100) using one or more of the switches. A packet is routed by every switch along the path from the source device of the packet to the destination device of the packet. As shown in FIG. 1, the path between an upstream device (182, 186) and a downstream device (184, 188) includes the local switch (160). Accordingly, a packet that is both (i) generated by an upstream device (182, 186); and (ii) destined for a downstream device (184, 188) is routed by the local switch (160).

In one or more embodiments of the invention, the local switch (160) has multiple components including multiple queues (i.e., Upstream Packet Queue (UPQ) (162), Local Packet Queue (LPQ) (164)), counters and registers (140), a scheduling engine (130), a routing engine (131), and a lookup table (135). In one or more embodiments of the invention, the lookup table (135) and the counters and registers (140) are part of the scheduling engine (130). Further, the queues (162, 164), the scheduling engine (130), the routing engine (131), the counters and registers (140), and the lookup table (135) may each be implemented in any combination of hardware or software. Each component of the local switch (160) is discussed below.

In one or more embodiments of the invention, the queues (162, 164) in the local switch (160) are used to store incoming packets. For example, the UPQ (162) may store incoming packets from the upstream switch k (114) (i.e., upstream packets) that are destined for any of the downstream devices (184, 188). Further, the LPQ (164) may store incoming packets that are generated by the local device (180) (i.e., local packets) and destined for any of the downstream devices (184, 188). In one or more embodiments of the invention, the upstream switch k (114) and the local device (180) are directly connected to the UPQ (162) and the LPQ (164), respectively. In such embodiments, the upstream switch k (114) may be configured to push an upstream packet onto the UPQ (162) and the local device (180) may be configured to push a local packet onto the LPQ (164).

In one or more embodiments of the invention, the routing engine (131) includes any combination of hardware (e.g., multiplexers, flip flops, registers, lookup tables, transistors, processors, integrated circuits, etc.) and software components (e.g., an instruction set executing on a hardware component). The routing engine (131) may be configured to route an incoming packet from an upstream device (182, 186) to either the local device (180) or the UPQ (162), depending on whether the incoming packet is destined for the local device (180) or destined for a downstream device (184, 188).

In one or more embodiments of the invention, the scheduling engine (130) includes any combination of hardware (e.g., multiplexers, flip flops, registers, lookup tables, transistors, processors, integrated circuits, etc.) and software components (e.g., an instruction set executing on a hardware component). The scheduling engine (130) is configured to (i) forward upstream packets from the UPQ (162) to the downstream switch j (120); and (ii) forward local packets from the LPQ (164) to the downstream switch j (120). Accordingly, providing both the UPQ (162) and the LPQ (164) have packets destined for a downstream device (184, 188), the scheduling engine (130) is configured to forward upstream packets to the downstream switch j (120) and forward local packets to the downstream switch j (120) according to a schedule.

In one or more embodiments of the invention, the scheduling engine (130) forwards local packets or forwards upstream packets according to a fairness protocol. In other words, the fairness protocol determines when the local switch (160) is to forward upstream packets and when the local switch (160) is to forward local packets. The fairness protocol effectively implements a "fair" allocation of the existing finite bandwidth between the local device and the upstream devices (discussed below). The fairness protocol may be implemented in software and executed on the scheduling engine (130). Alternatively, the scheduling engine (130) may include a hardware implementation of the fairness protocol.

In one or more embodiments of the invention, the fairness protocol sets one or more of the counters and registers (140) using values in the lookup table (135), and then reads the counters and registers (140) at a subsequent time to determine whether the local switch (160) should forward upstream packets or whether the local switch should forward local packets (discussed below).

Embodiments of the invention have focused on packets traveling from upstream devices (182, 186) and local device (180) to downstream devices (184, 188) using both the queues (162, 164), respectively, and the counters and registers (140) in the local switch (160). However, those skilled in the art, having the benefit of this detailed description, will appreciate that a duplicate set of queues, counters, and registers may exist in the local switch (160) to enable packet travel from downstream devices (184, 188) and local device (180) to upstream devices (182, 186).

Figure 2:
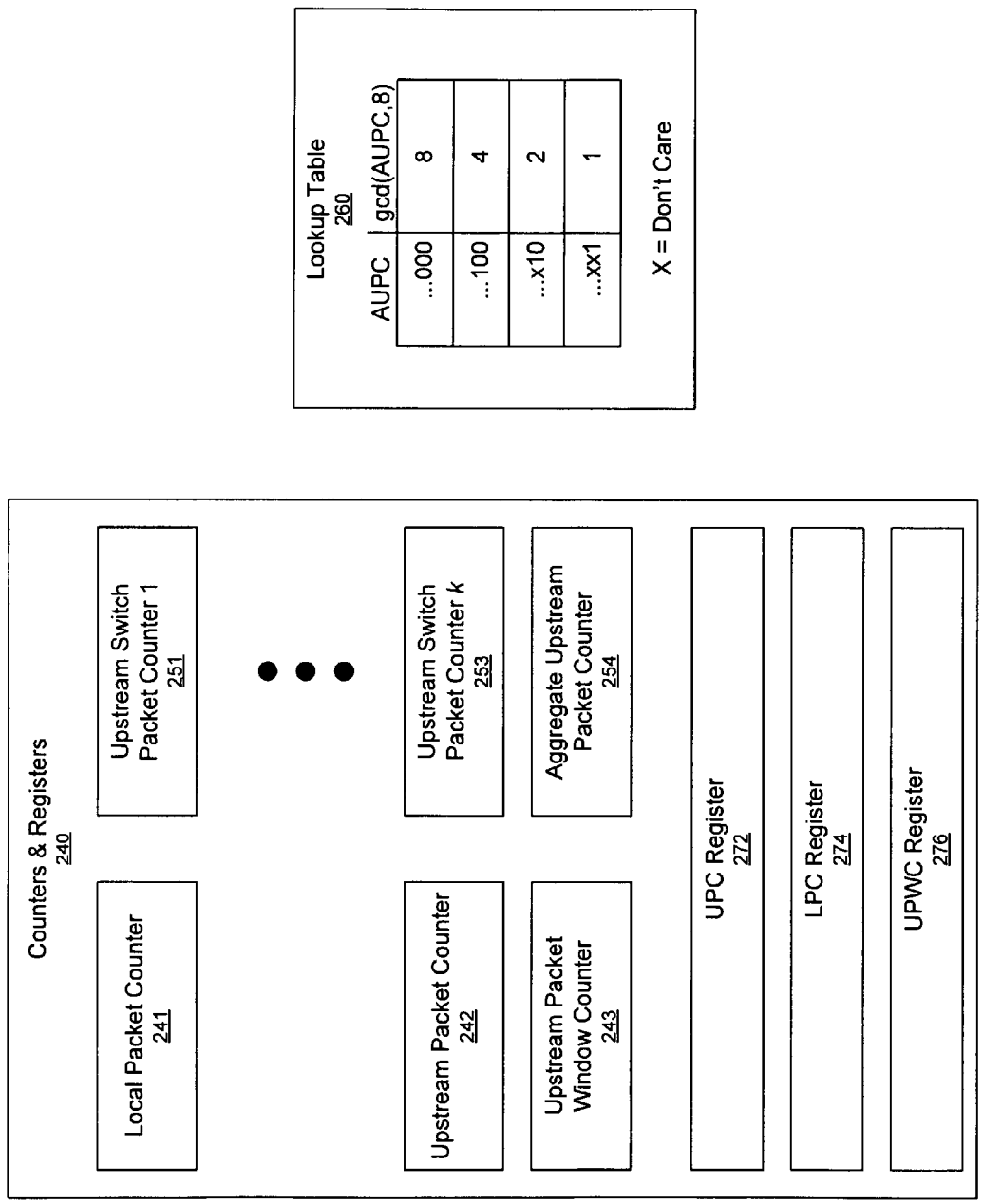
FIG. 2 shows one or more components of the system in FIG. 1, in accordance with one or more embodiments of the invention.

FIG. 2 shows counters and registers (240) in accordance with one or more embodiments of the invention. The counters and registers (240) are essentially the same as the counters and registers (140), discussed above in reference to FIG. 1. As shown in FIG. 2, the counters and registers (240) include a local packet counter (LPC) (241), an upstream packet counter (UPC) (242), an upstream packet window counter (UPWC) (243), multiple upstream switch packet counters (USPC) (i.e., USPC 1 (251), USPC k (253)), and an aggregate upstream packet counter (AUPC) (254). The counters and registers (240) also include a UPC Register (272), a LPC Register (274), and a UPWC Register (276). FIG. 2 also shows a lookup table (260) storing the greatest common divisor (gcd) of a predetermined value (i.e., eight) and various values of the AUPC (254). The lookup table (260) is essentially the same as the lookup table (135), discussed above in reference to FIG. 1. Both the counters and registers (240) and the lookup table (260) are discussed below.

In one or more embodiments of the invention, a USPC (251, 253) is a hardware counter corresponding to an upstream device. Specifically, there may be one USPC for each upstream device in the system (100). Accordingly, USPC 1 (251) may correspond to the upstream device 1 (186). Similarly, USPC k (253) may correspond to the upstream device k (182). A USPC is incremented every time the local switch (160) forwards a packet that was generated by the corresponding upstream device. For example, USPC 1 (251) increments by one every time the local switch (160) forwards a packet that was generated by the upstream device 1 (186). As another example, USPC k (253) increments by one every time the local switch (160) forwards a packet that was generated by the upstream device k (182). Each USPC (251, 253) may be a 3-bit hardware counter. Accordingly, each 3-bit USPC (251, 253) wraps around to reach the value of eight. Those skilled in the art, having the benefit of this detailed description, will appreciate that when a USPC (251, 253) reaches eight (or any predetermined value), this implies that eight upstream packets generated by the same upstream device were included in the last N forwarded upstream packets (i.e., N≧8).

In one or more embodiments of the invention, the AUPC (254) is a hardware counter that increments by one every time an upstream packet is forwarded by the local switch (160), regardless of which upstream device generated the upstream packet. In other words, the AUPC (254) increments by the cardinality of the forwarded upstream packets. For example, AUPC (254) increments by five (i.e., five separate increments by one) when three upstream packets, generated by upstream device 1 (186), and two upstream packets, generated by upstream device k (182), are forwarded by the local switch (160) (i.e., 3 upstream packets+2 upstream packets=5 upstream packets). In one or more embodiments of the invention, the AUPC (254) is a 7-bit hardware counter. Accordingly, the AUPC (254) may have a maximum value of 127.

In one or more embodiments of the invention, the LPC (241) is a hardware counter that decrements by one every time the local switch (160) forwards a local packet. For example, when the local switch (160) forwards a local packet from the LPQ (164), the LPC (241) decrements by one. In one or more embodiments of the invention, when at least one USPC (251, 253) reaches a predetermined value, the LPC (241) is set to LPC (241)=(predetermined value)/gcd(AUPC (254), predetermined value). The predetermined value may correspond to the wrap around value of the USPCs (251, 253). For example, in view of the above, the predetermined value may be eight. Accordingly, the LPC (241) may be set to LPC (241)=8/gcd (AUPC (254), 8) every time at least one USPC (251, 253) reaches eight.

In one or more embodiments of the invention, the UPC (242) is a hardware counter that decrements by one every time the local switch (160) forwards an upstream packet, regardless of which upstream device generated the upstream packet. In other words, the UPC (242) may decrement by the cardinality of the forwarded upstream packets. For example, when the local switch (160) forwards an upstream packet from the UPQ (162), the UPC (242) decrements by one. Similarly, when the local switch (160) forwards three upstream packets from the UPQ (162), the UPC (242) decrements by three (i.e., three separate decrements by one). In one or more embodiments of the invention, when at least one USPC (251, 253) reaches a predetermined value, the UPC (242) is set to UPC (242)=AUPC (254)/gcd(AUPC (254), predetermined value). As discussed above, the predetermined value may be eight and correspond to the wrap around value of a USPC (251, 253). Accordingly, the UPC (242) may be set to UPC (242)= AUPC (254)/gcd(AUPC (254), 8) every time at least one USPC (251, 253) reaches eight.

In one or more embodiments of the invention, the UPWC (243) is a 3-bit hardware counter that specifies how many back-to-back upstream packets can be forwarded. Accordingly, the UPWC (243) decrements by one every time the local switch (160) forwards an upstream packet. In other words, the UPWC (243) may decrement by the cardinality of the forwarded upstream packets. In one or more embodiments of the invention, every time at least one USPC (251, 253) reaches a predetermined value, the UPWC (243) is set to the value of UPWC (243)=AUPC (254)>>3 (i.e., the value of AUPC (254) following three bit shift right operations). As discussed above, the predetermined value may be eight and correspond to the wrap around value of a USPC (251, 253). Accordingly, the UPWC (243) may be set to UPWC (243)= AUPC (254)>>3 every time at least one USPC (251, 253) reaches eight. Those skilled in the art, having the benefit of this detailed description, will appreciate that AUPC (254)>>3 is equivalent to $\lfloor(\text{AUPC }(254)/8)\rfloor$ (i.e., rounding down the quotient of AUPC (254) divided by 8).

In one or more embodiments of the invention, the UPC Register (272), the LPC Register (274), and the UPWC Register (276) are registers holding values for restoring the UPC (242), the LPC (241), and the UPWC (243), respectively. In other words, the registers (272, 274, 276) may store the "old" or previous values of the corresponding counters (241, 242, 243). In one or more embodiments of the invention, the registers (272, 274, 276) may be updated independently of the corresponding counters.

In one or more embodiments of the invention, the UPC Register (272) is set to UPC Register (272)=AUPC (254)/gcd (AUPC (254), predetermined value) every time at least one USPC (251, 253) reaches the predetermined value. Further, the LPC Register (274) may be set to LPC Register (274)= (predetermined value)/gcd(AUPC (254), predetermined value) every time at least one USPC (251, 253) reaches the predetermined value. Further still, the UPWC Register (276) may be set to UPWC Register (276)=AUPC (254)>>3, every time at least one USPC (251, 253) reaches the predetermined value. In one or more embodiments of the invention, the UPC Register (272), the LPC Register (274), and the UPWC Register (276) are each 3-bits in size.

Still referring to FIG. 2, the lookup table (260) stores the greatest common divisor of a predetermined value (e.g., eight) and various values of the AUPC (254). For example, if the last three bits of the AUPC (254) are 000, the gcd(AUPC (254)= . . . 000, 8)=8. Similarly, if the last three bits of the AUPC (254) are 100, the gcd(AUPC (254)= . . . 100, 8)=4. As yet another example, if the last three bits of the AUPC (254) are x10, the gcd(AUPC (254)= . . . x10, 8)=2. For all other values of AUPC (254), the gcd(AUPC (254), 8)=1. Those skilled in the art, having the benefit of this detailed description, will appreciate that accessing the lookup table (260) requires less time and fewer resources than calculating the greatest common divisor of two numbers. Accordingly, by creating the lookup table (260) prior to running a process (i.e., the fairness protocol) requiring the greatest common divisor of two numbers, computational time and resources are saved.

Figure 3:
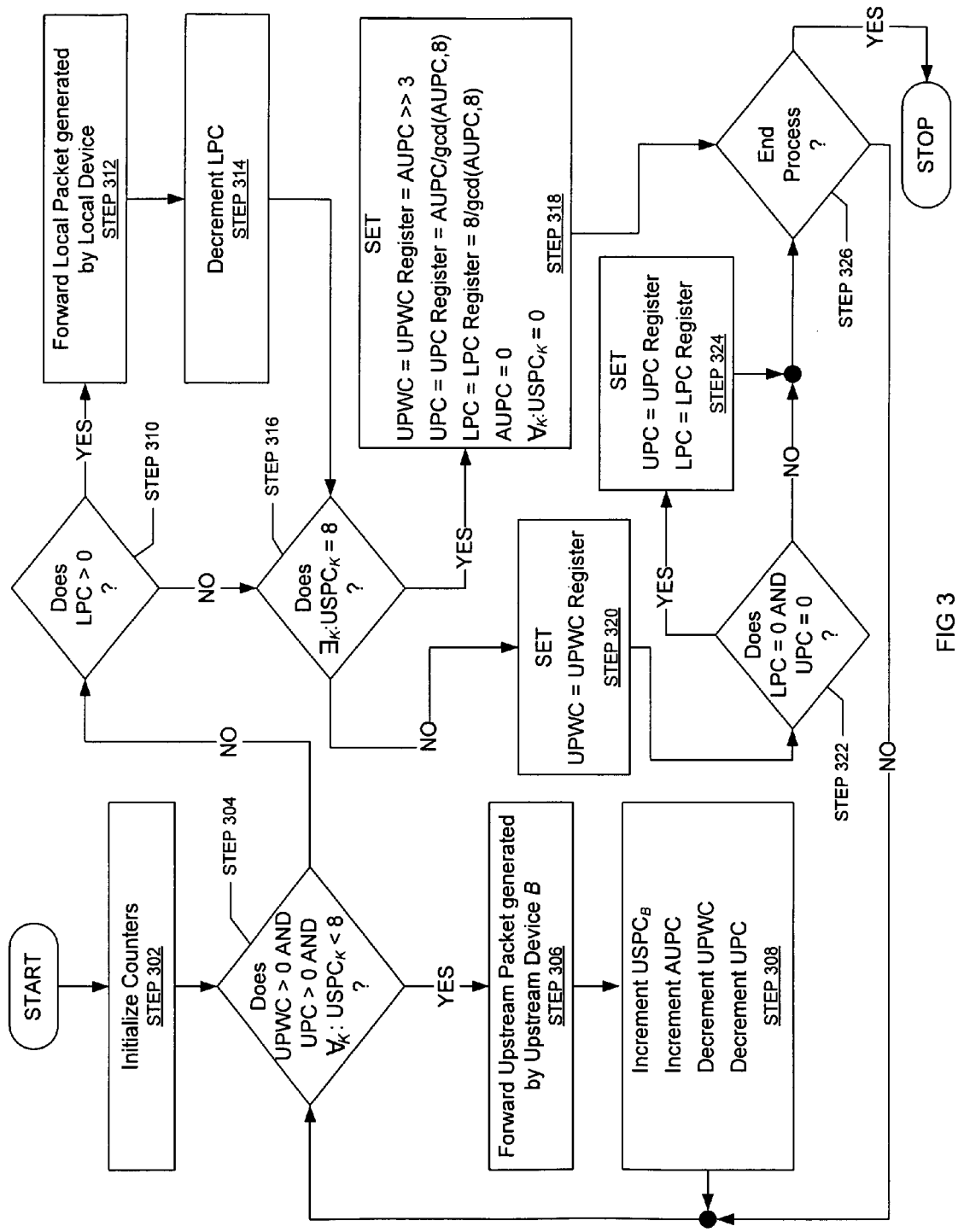
FIG. 3, FIG. 4, and FIG. 5 show flowcharts in accordance with one or more embodiments of the invention.

FIG. 3 shows a flowchart in accordance with one or more embodiments of the invention. The process shown in FIG. 3 may be a fairness protocol used by a switch (e.g., local switch (160), discussed above in reference to FIG. 1) to schedule the forwarding of upstream packets and the forwarding of local packets. Those skilled in the art, having the benefit of this detailed description, will appreciate that the sequence of steps shown in FIG. 3 may differ among embodiments of the invention, and that one or more of the steps shown in FIG. 3 may be repeated or omitted.

Initially, an initialization procedure is executed to reset the values of one or more counters (e.g., LPC, UPC, UPWC, USPC 1, . . . , USPC k−1, USPC k, AUPC) (STEP 302). For example, the initialization procedure sets the AUPC and all the USPCs to zero (i.e., USPC 1=0, . . . , USPC k−1=0, USPC k=0, and AUPC=0). Further, the initialization procedure stores the reset values of the LPC, the UPC, and the UPWC in registers (e.g., LPC Register (274), UPC Register (272), UPWC Register (276)) for subsequent use (discussed below). The initialization procedure is described below in reference to FIG. 5.

In STEP 304, the counters are read to determine whether the UPWC exceeds zero, the UPC exceeds zero, and all USPCs are less than a predetermined value. As discussed above, the predetermined value may correspond to the wrap around value of a USPC (e.g., eight). When it is determined that all conditions of STEP 304 are true, and that upstream packets are present (i.e., the UPQ is not empty), the process proceeds to STEP 306. Otherwise, when it is determined that at least one of the conditions in STEP 304 is false, or when it is determined that no upstream packets exist to forward (i.e., the UPQ is empty), the process proceeds to STEP 310.

In STEP 306, an upstream packet is selected and forwarded. In one or more embodiments of the invention, the selected upstream packet may be the packet at the head of the UPQ. In one or more embodiments of the invention, the upstream packet may be selected from a random-access memory implementing the UPQ. In one or more embodiments of the invention, the upstream packet is selected according to a priority value (i.e., a ranking) assigned to the upstream packet. As discussed above, the upstream packet is generated by one of the upstream devices (i.e., Upstream Device b, where $b \subset \{1, 2, \ldots, k-1, k\}$).

In STEP 308, in response to forwarding the upstream packet, the USPC corresponding to the upstream device b is incremented by one, the AUPC is incremented by one, the UPWC is decremented by one, and the UPC is decremented by one. Those skilled in the art, having the benefit of this detailed description, will appreciate that the process of FIG. 3 continuously repeats STEP 306 and STEP 308 until either (i) at least one of the conditions set forth in STEP 304 is false; or (ii) no upstream packets exist (i.e., the UPQ is empty). Accordingly, the number of upstream packets forwarded from the local device to a downstream device depends on the values of the UPC, the UPWC, and each of the USPCs.

In STEP 310, the LPC is read to determine whether the LPC exceeds zero. When it is determined that the LPC exceeds zero and at least one local packet exists (i.e., the LPQ is not empty), the process proceeds to STEP 312. Otherwise, when it is determined that the LPC is zero or that the LPQ is empty, the process proceeds to STEP 316.

In STEP 312, a local packet is selected and forwarded downstream. In one or more embodiments of the invention, the local packet is selected from the head of the LPQ. In one or more embodiments of the invention, the local packet is selected from any location in the LPQ. In response to forwarding the local packet, the LPC decrements by one (STEP 314).

In STEP 316, it is determined whether at least one USPC equals the predetermined value (e.g., 8). As discussed above, when a USPC reaches eight (or any predetermined value), this implies that eight upstream packets generated by the same upstream device were included in the last N forwarded upstream packets (i.e., N≧8). When it is determined that at least one USPC equals the predetermined value, the process proceeds to STEP 318. When it is determined that none of the USPCs equal the predetermined value, the process proceeds to STEP 320.

In STEP 318, the counters are reset. Specifically, the UPWC is set to UPWC=AUPC>>3; the UPC is set to UPC=AUPC/gcd(AUPC, 8); the LPC is set to LPC=8/gcd (AUPC, 8); the AUPC is set to AUPC=0; and the USPCs are set to USPC 1=0, . . . , USPC k−1=0, and USPC k=0. In one or more embodiments of the invention, instead of calculating the greatest common divisor during the execution of STEP 318, the greatest common divisor is determined by accessing a lookup table (e.g., lookup table (260), discussed above in reference to FIG. 2) storing required greatest common divisors.

As discussed above, the LPC Register, the UPC Register, and the UPWC Register are initially set up by the initialization process (STEP 302). In STEP 318, these registers are upgraded such that the LPC Register is set to LPC Register=8/ gcd(AUPC, 8), the UPC Register is set to UPC Register=AUPC/gcd(AUPC, 8), and the UPWC Register is set to UPWC Register=AUPC>>3. At a subsequent time in the process of FIG. 3, the LPC, the UPC, and/or the UPWC may be restored to the values in the LPC register, the UPC register, and the UPWC register, respectively.

Alternatively, in STEP 320 the old value of UPWC is restored. In other words, the UPWC is set to UPWC=UPWC Register before proceeding to STEP 322. As discussed the UPWC register is initially set by the initialization process (STEP 302) and may be later modified by STEP 318.

In STEP 322, the LPC and the UPC are read to determine if both the LPC and the UPC equal zero. When it is determined that both the LPC and the UPC are zero (i.e., LPC=UPC=0), the process proceeds to STEP 324. Otherwise, when it is determined that the LPC exceeds zero and/or the UPC exceeds zero, the process proceeds to STEP 326.

In STEP 324, the old values of the UPC and the LPC are restored. In other words, UPC is set to UPC=UPC Register and LPC is set to LPC=LPC Register, before proceeding to STEP 326. As discussed above, the UPC Register and the LPC register are initially set by the initialization process (STEP 302) and may be later modified by STEP 318. After STEP 322 or STEP 324, the process returns to STEP 304 (i.e., the process executes in a loop). Alternatively, execution of the process may be ended (e.g., by a user) (i.e., STEP 326). In one or more embodiments of the invention, STEP 326 is omitted. In such embodiments, STEP 304 is immediately executed following STEP 318, STEP 322, or STEP 324.

In view of the fairness protocol shown in FIG. 3, once the UPC, the LPC, and the UPWC are updated (i.e., STEP 302 or STEP 318), |UPWC| upstream packets are processed back-to-back, each time decrementing the UPWC and the UPC by one (i.e., STEP 306 and STEP 308). Next, the scheduler processes one local packet and decrements the LPC by one (i.e., STEP 312 and STEP 314). The pattern of forwarding multiple upstream packets followed by a single local packet repeats until either (i) LPC=UPC=0 (i.e., STEP 322; or (ii) at least one USPC=8 (i.e., STEP 316). Regardless of whether (i) or (ii) is true, the UPWC is set to (a possibly new) value of APUC>>3, the UPC is set to APUC, and the LPC is set to 8, both reduced (i.e., divided) by gcd(AUPC, 8) (i.e., STEP 318).

Those skilled in the art, having the benefit of this detailed description, will appreciate that if only the LPC drops to zero, the fairness protocol of FIG. 3 exclusively services remote packets, decrementing the UPC each time the fairness protocol forwards an upstream packet until the UPC is zero. Those skilled in the art, having the benefit of this detailed description, will also appreciate that as soon as at least one USPC reaches 8, all counters are recalculated based on the new value of the AUPC.

Figure 4:
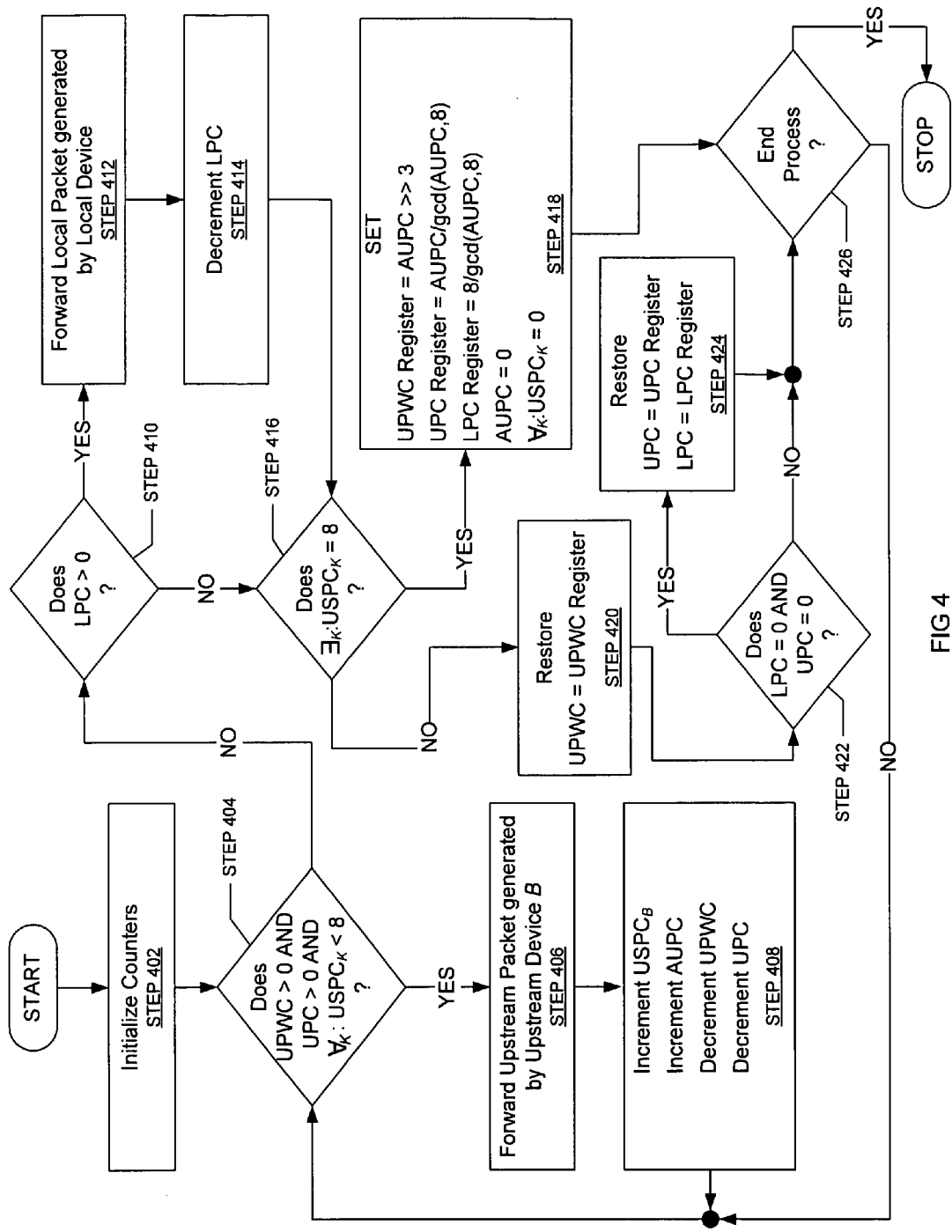

FIG. 4 shows a flowchart in accordance with one or more embodiments of the invention. The process shown in FIG. 4 may be a fairness protocol used by a switch (e.g., local switch (160), discussed above in reference to FIG. 1) to select between forwarding upstream packets and forwarding local packets. Those skilled in the art, having the benefit of this detailed description, will appreciate that the sequence of steps shown in FIG. 4 may differ among embodiments of the invention, and that one or more of the steps shown in FIG. 4 may be repeated or omitted.

In one or more embodiments of the invention, STEPS 402, 404, 406, 408, 410, 412, 414, 416, 420, 422, 424, and 426, are essentially the same as STEPS 302, 304, 306, 308, 310, 312, 314, 316, 320, 322, 324, and 326, respectively (discussed above in reference to FIG. 3). Further, as discussed above in reference to FIG. 3, the LPC Register, the UPC Register, and the UPWC Register are registers initially set up by the initialization process (STEP 402). In STEP 418, these registers, but not their corresponding counters, are updated such that the LPC Register is set to LPC Register=8/gcd(AUPC, 8), the UPC Register is set to UPC Register=AUPC/gcd(AUPC, 8), and the UPWC Register is set to UPWC Register=AUPC>>3. Further, the AUPC is set to AUPC=0 and the USPCs are set to USPC 1=0, ..., USPC k−1=0, and USPC k=0. In one or more embodiments of the invention, instead of calculating the greatest common divisor during the execution of STEP 418, the greatest common divisor is determined by accessing a lookup table (e.g., lookup table (260), discussed above in reference to FIG. 2) storing required greatest common divisors.

In view of the fairness protocol shown in FIG. 4, once the UPC, the LPC, and the UPWC are updated (i.e., STEP 402, STEP 420, STEP 424), |UPWC| upstream packets are processed back-to-back, each time decrementing the UPWC and the UPC by one (i.e., STEP 406 and STEP 408). Next, the scheduler processes one local packet and decrements the LPC by one (i.e., STEP 412 and STEP 414). The pattern of forwarding multiple upstream packets followed by a single local packet repeats until either (i) LPC=UPC=0 (i.e., STEP 422); or (ii) at least one USPC=8 (i.e., STEP 416). If (i) is true, the LPC and the UPC are restored to values in the LPC Register and the UPC Register, respectively (i.e., STEP 424). If (ii) is true, the LPC Register, the UPC Register, and the UPWC Register are updated (i.e., STEP 418).

Figure 5:
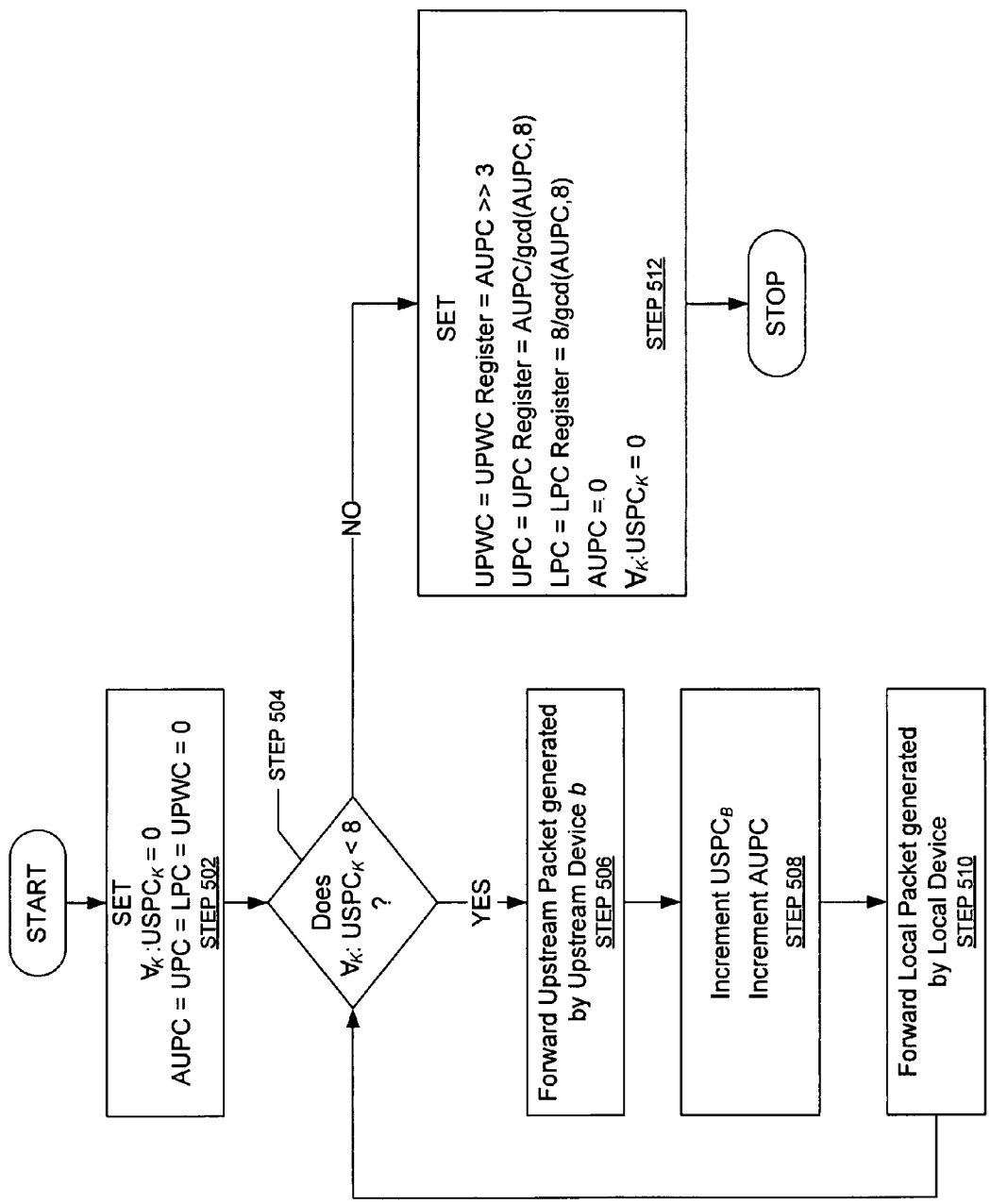

FIG. 5 is a flowchart in accordance with one or more embodiments of the invention. The process shown in FIG. 5 may be used as the initialization process described in STEP 302 (discussed above in reference to FIG. 3) and STEP 402 (discussed above in reference to FIG. 4). Those skilled in the art, having the benefit of this detailed description, will appreciate that the sequence of steps shown in FIG. 5 may differ among embodiments of the invention, and that one or more of the steps shown in FIG. 5 may be repeated or omitted.

Initially, all counters are set to zero (i.e., AUPC=0, UPC=0, LPC=0, UPWC=0, USPC 1=0, ..., USPC k−1=0, USPC k=0) (STEP 502). In STEP 504, it is determined whether all of the USPCs are less than a predetermined value. For example, the predetermined value may be eight and correspond to the wrap around value of a 3-bit USPC. When it is determined that all the USPCs are less than 8, and that the UPQ has at least one upstream packet (i.e., the UPQ is non-empty) or the LPQ has at least one local packet (i.e., the LPQ is non-empty), the process proceeds to STEP 506. Otherwise, when it is determined that at least one USPC exceeds 7, the process proceeds to STEP 512.

In STEP 506, an upstream packet is selected and forwarded. In one or more embodiments of the invention, the selected upstream packet may be the packet at the head of the UPQ. In one or more embodiments of the invention, the upstream packet may be selected from a random location in the UPQ. As discussed above, an upstream packet is generated by one of the upstream devices (i.e., Upstream Device b, where b ⊂ {1, 2, ..., k−1, k}).

In STEP 508, both the AUPC and the USPC b (i.e., the USPC corresponding to the upstream device b) increment by one in response to forwarding the upstream packet. Those skilled in the art, having the benefit of this detailed description, will appreciate that STEP 406 and STEP 408 may be omitted if the UPQ is empty.

In STEP 510, a local packet is forwarded (e.g., from the LPQ) and the process returns to STEP 504. In the event the LPQ is empty, STEP 510 may be omitted. Further, those skilled in the art, having the benefit of this detailed description, will appreciate that STEP 506, STEP 508, and STEP 510 continuously repeat until at least one USPC equals or exceeds 8. In the event the LPQ is empty, the process of FIG. 5 services (i.e., forwards) only upstream packets. Similarly, in the event the UPQ is empty, the process of FIG. 5 services (i.e., forwards) only local packets.

As discussed above, when the condition(s) of STEP 504 are false, the process proceeds to STEP 512. STEP 512 is essentially the same as STEP 318, discussed above in reference to FIG. 3. As shown in FIG. 5, in STEP 512, the counters are reset. Specifically, the UPWC is set to UPWC=AUPC>>3; the UPC is set to UPC=AUPC/gcd (AUPC, 8); the LPC is set to LPC=8/gcd(AUPC, 8); the AUPC is set to AUPC=0; and the USPCs are set to USPC 1= 0, . . . , USPC k−1=0, and USPC k=0. As discussed above, instead of calculating the greatest common divisor during the execution of STEP 518, the greatest common divisor is determined by accessing a lookup table (e.g., lookup table (260), discussed above in reference to FIG. 2).

In addition to resetting the counter, multiple registers (i.e., the LPC Register, the UPC Register, and the UPWC Register) are set as shown in STEP 512. As discussed above, these registers may be used to restore the values of the LPC, the UPC, and the UPWC during operation of the process shown in FIG. 3. Following, execution of STEP 512, the process ends.

The process shown in FIG. 5 initially sets all counters to zero. Then, as long as none of the USPCs have reached eight, an upstream packet is forwarded (i.e., providing an upstream packet is available), the AUPC and corresponding USPC increment in response to forwarding the upstream packet, and a local packet is forwarded (i.e., providing a local packet is available). When at least one of the USPCs reach eight, values for the UPWC, the UPC, and the LPC are calculated, and the USPCs and AUPC are set to zero.

Those skilled in the art, having the benefit of this detailed description, will appreciate that during the process of FIG. 5, there is no effort to achieve a "fair" allocation of bandwidth between local and upstream packets. This unfairness lasts for most the maximum value of AUPC packets (e.g., 127 packets when the AUPC is 8-bits).

FIG. 6 shows examples (i.e., Example 1 (610), Example 2 (612)) in accordance with one or more embodiments of the invention. Both examples (610, 612) include the resulting bandwidth allocations between upstream packets and local packets after executing the fairness protocol of either FIG. 3 or FIG. 4. As shown in Example 1 (610), there exists a system having two 3-bit USPCs (i.e., USPC A, USPC B). During the initialization process shown in FIG. 5, the USPC A=6, the USPC B=8, and the AUPC=14 before STEP 512 is executed. Accordingly, the initialization process sets the UPWC=UPWC Register=AUPC>>3=1, the initialization process sets the UPC=UPC Register=AUPC/gcd(AUPC, 8)=14/gcd(14,8)=14/2=7, and the initialization process sets the LPC=LPC Register=8/gcd(AUPC, 8)=8/2=4. Now the fairness protocol of FIG. 3 or FIG. 4 will service UPWC=1 upstream packet, decrement the UPC to 6, service one local packet, decrement the LPC to 3, etc., until the LPC becomes 0. The resulting pattern of packets is: U L U L U L U L U U U (i.e., U=forwarded upstream packet and L=forwarded local packet).

In Example 2 (612), there exists a system having three 3-bit USPCs (i.e., USPC X, USPC Y, USPC Z). During the initialization process shown in FIG. 5, USPC X=6, USPC Y=6, USPC Z=8, and the AUPC=20 before STEP 512 is executed. Accordingly, the initialization process sets the UPWC=UPWC Register AUPC>>3=2, the initialization process sets the UPC=UPC Register=AUPC/gcd(AUPC, 8)=20/gcd(20,8)=20/4=5, and the initialization process sets the LPC=LPC Register=8/gcd(AUPC, 8)=8/4=2. Now, the fairness protocol of FIG. 3 or FIG. 4 will service UPWC=2 remote packets, decrease the UPC to 3, then it will service one local packet, decrement the LPC to 1, etc. until the LPC becomes 0. The resulting pattern of packets is: U U L U U L U (i.e., U=forwarded upstream packet, L=forwarded local packet).

Figure 7:
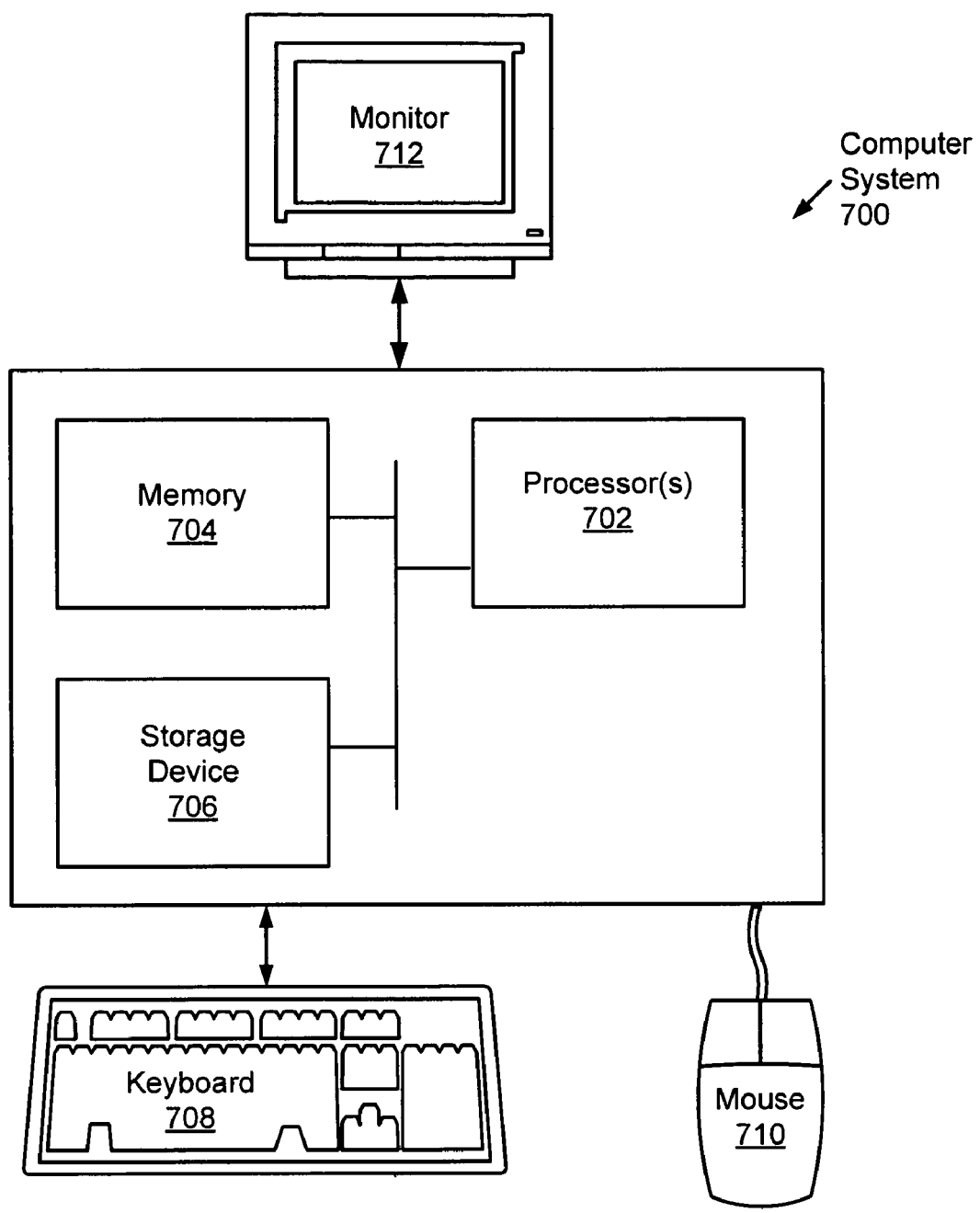
FIG. 7 shows a computer system in accordance with one or more embodiments of the invention.

FIG. 7 shows a computer system (700) in accordance with one or more embodiments of the invention. One or more portions of the invention may be a component in the computer system (700) (e.g., an integrated circuit in the computer system (700)). As shown in FIG. 7, the computer system (700) includes a processor (702), associated memory (704), a storage device (706), and numerous other elements and functionalities typical of today's computers (not shown). The computer system (700) may also include input means, such as a keyboard (708) and a mouse (710), and output means, such as a monitor (712). The computer system (700) is connected to a local area network (LAN) or a wide area network (e.g., the Internet) (not shown) via a network interface connection (not shown). Those skilled in the art will appreciate that these input and output means may take other forms, now known or later developed. Further, those skilled in the art will appreciate that one or more elements of the aforementioned computer system (700) may be located at a remote location and connected to the other elements over a network.

One or more embodiments of the invention exhibit one or more of the following advantages. By reducing (i.e., dividing) the AUPC by the gcd(AUPC, 8) (i.e., in the case of the calculated UPC or UPC Register value) and by reducing (i.e., dividing) the predetermined value by the gcd(AUPC, predetermined value) (i.e., in the case of the calculated LPC or LPC Register value), the maximum burst length of back-to-back upstream packets is reduced. However, those skilled in the art, having the benefit of this detailed description, will appreciate that reducing the UPC, the UPC Register, the LPC, and/or the LPC Register by gcd(AUPC, predetermined value) is optional.

Further, consider the following example which is not meant to limit the invention in any way. A local switch sending packets with insertion rate $R_{INS}$=x/y, forwards x local packets after forwarding y upstream packets. This is equivalent to a transmission rate $R_{TR}$=x/(x+y). In addition, the local switch has (i) a 3-bit counter $C_i$ for each of the i upstream sources attached to the local switch in a daisy chain topology; and (ii) an 8-bit D counter. Counter D is incremented every time an upstream packet is forwarded by the local switch. Counter $C_i$ counts upstream packets sent by upstream source i that are forwarded by the local switch. As soon as one of the $C_i$ counters wraps around reaching the value of 8, an insertion rate of $R_{INS}$=8/D is calculated and implemented by the local switch. This corresponds to transmission rate $R_{TR}$=8/(8+D). Accordingly, the insertion rate at the local switch is equal to the largest insertion rate of the upstream source. This is an ideal fairness protocol.

Still focusing on the example, consider two upstream sources: $S_A$ and $S_B$. The local switch forwards 6 upstream packets from $S_A$ and 8 upstream packets from $S_B$ (i.e., $C_A$=6, $C_B$=8, and D=14). This configuration corresponds to the Example 1 (610), discussed above in reference to FIG. 6. Accordingly, an insertion rate of $R_{INS}$=8/14=4/7 is calculated and implemented by the local switch. This corresponds to a transmission rate $R_{TR}$=8/(8+14)=4/11. The resulting pattern of packets (i.e., bandwidth allocation) is: U U L U U L U U L (i.e., U=forwarded upstream packet, L=forwarded local packet). In other words, the resulting pattern of packets has the same number of upstream packets and the same number of local packets as the Example 1 (610). Thus, embodiments of the present invention perform as well as the ideal fairness protocol in some scenarios.

Still focusing on the example, consider three upstream sources: $S_X$, $S_Y$, and $S_Z$. The local switch forwards 6 upstream packets from $S_X$, 6 upstream packets from $S_Y$, and 8 upstream packets from $S_Z$ (i.e., $C_X=C_Y=6$, $C_Z=8$, and $D=20$). This configuration corresponds to the Example 2 (612), discussed above in reference to FIG. 6. Accordingly, an insertion rate of $R_{INS}=8/20=2/5$ is calculated and implemented by the local switch. This corresponds to transmission rate $R_{TR}=8/(8+20)=2/7$. The resulting pattern of packets (i.e., bandwidth allocation) is: U U L U U L U (i.e., U=forwarded upstream packet, L=forwarded local packet). In other words, the resulting pattern of packets has the same number of upstream packets and the same number of local packets as the Example 2 (612). Thus, as discussed above, embodiments of the present invention perform as well as the ideal fairness protocol in some scenarios.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for transmitting packets, comprising:
   forwarding a first set of upstream packets from a local switch to a downstream switch;
   modifying, in the local switch, an upstream packet window counter (UPWC), wherein the UPWC is a 3-bit hardware counter that specifies how many back-to-back upstream packets can be forwarded, an upstream packet counter (UPC), and a plurality of upstream switch packet counters (USPCs) in response to forwarding the first set of upstream packets, wherein at least one of the plurality of USPCs equals a predetermined value after forwarding the first set of upstream packets;
   forwarding a local packet from the local switch to the downstream switch after forwarding the first set of upstream packets;
   setting a UPC register to a sum of the plurality of USPCs, setting a UPWC register to the sum after performing a plurality of bitwise right shift operations on the sum, and setting the plurality of USPCs to zero;
   forwarding, after setting the plurality of USPCs to zero, a second set of upstream packets from the local switch to the downstream switch;
   modifying the UPWC, the UPC, and the plurality of USPCs in response to forwarding the second set of upstream packets, wherein each of the plurality of USPCs is less than the predetermined value after forwarding the second set of upstream packets;
   restoring the UWPC to a value of the UPWC register after forwarding the second number of packets; and
   forwarding, after restoring the UWPC, a third set of upstream packets from the local switch to the downstream switch.

2. The method of claim 1, further comprising:
   decrementing the UPC and the UPWC in response to forwarding each of the first set of upstream packets.

3. The method of claim 1, further comprising:
   decrementing the UPC and the UPWC in response to forwarding each of the second set of upstream packets, wherein the UPWC is zero after forwarding the second set of upstream packets.

4. The method of claim 1, further comprising:
   dividing the UPC register by a greatest common divisor of the predetermined value and the sum before forwarding the second plurality of upstream packets.

5. The method of claim 1, further comprising:
   decrementing a local packet counter (LPC) in response to forwarding the local packet; and
   setting a LPC register to the predetermined value before forwarding the second set of upstream packets.

6. The method of claim 5, further comprising:
   dividing the LPC register by a greatest common divisor of the predetermined value and the sum before forwarding the second set of upstream packets.

7. The method of claim 5, further comprising:
   setting the LPC to the predetermined value before forwarding the second set of upstream packets.

8. The method of claim 7, further comprising:
   dividing the LPC by a greatest common divisor of the predetermined value and the sum before forwarding the second set of upstream packets.

9. The method of claim 5, further comprising:
   restoring the UPC to a value of the UPC register before forwarding the third set of upstream packets; and
   restoring the LPC to a value of the LPC register before forwarding the third set of upstream packets,
   wherein the UPC is zero and the LPC is zero after forwarding the second set of upstream packets.

10. The method of claim 1, further comprising:
    setting, before forwarding the second set of upstream packets, the UPC to the sum; and
    setting, before forwarding the second set of upstream packets, the UPWC to the sum after performing the plurality of bitwise right shift operations on the sum.

11. The method of claim 10, further comprising:
    dividing the UPC by a greatest common divisor of the predetermined value and the sum before forwarding the second plurality of upstream packets.

12. The method of claim 1, wherein the predetermined value is 8 and the plurality of bitwise right shift operations has a cardinality of 3.

13. The method of claim 1, wherein at least one selected from a group consisting of the first set of upstream packets, the second set of upstream packets, and the third set of upstream packets has a cardinality of 1.

14. The method of claim 1, wherein an upstream packet of the first set of upstream packets is generated by an upstream source operatively connected to the local switch, and wherein the upstream packet comprises a memory request for a data item in a memory associated with the downstream switch.

15. The method of claim 1, wherein the local switch and the downstream switch are located on a single chip.

16. The method of claim 1, further comprising:
    storing the sum in an aggregate upstream packet counter (AUPC); and
    setting the AUPC to zero before forwarding the second set of upstream packets.

* * * * *